(No Model.)
C. W. McLEAN.
Glass Building Block and Building.
No. 238,797. Patented March 15, 1881.
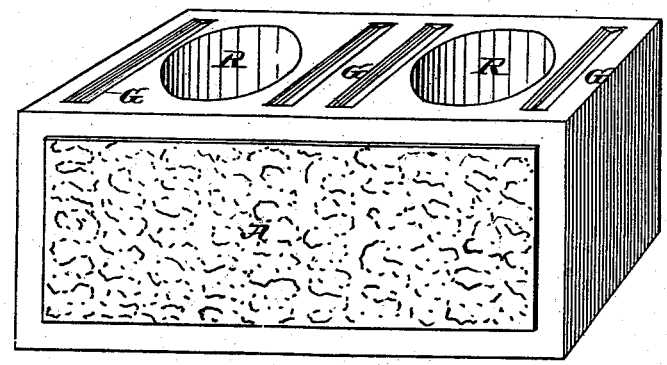
WITNESSES—
W. C. Adams.
Jesse Cup Jr.
INVENTOR—
Christopher W. McLean
per M. E. Dayton
Attorney

UNITED STATES PATENT OFFICE.

CHRISTOPHER W. McLEAN, OF CHICAGO, ILLINOIS.

GLASS BUILDING-BLOCK AND BUILDING.

SPECIFICATION forming part of Letters Patent No. 238,797, dated March 15, 1881.

Application filed July 30, 1880. (No model.)

*To all whom it may concern:*

Be it known that I, CHRISTOPHER W. MC-LEAN, of Chicago, State of Illinois, have invented certain new and useful Improvements in Glass Building-Blocks and Buildings; and I do hereby declare that the following is a full, clear, and exact description thereof, reference being had to the accompanying drawing, and to the letters of reference marked thereon, which form a part of this specification.

This invention relates to the use of glass as a material for buildings; and it consists, first, in the block of glass molded in proper form for building purposes; and, second, in the structure formed of molded glass blocks, substantially as hereinafter set forth, and pointed out in the claims.

I particularly design to apply my invention in the foundation of buildings, or in contact with the ground, as being more indestructible than stone, by reason of its non-absorbent qualities, and as being, for the same reason, a perfect means of cutting off the superstructure from the effects of moisture derived from the earth in the use of stone foundations through absorption and transmission by the latter. An important advantage is also expected from the electric insulation afforded by such material. In any case it is obvious that inestimable sanitary benefits will be obtained from the use for human habitations of a substance which can afford no lodgment to the seeds of disease or other means for its communication. This characteristic of glass will especially fit that material for use as the body of the structure in hospitals and infirmaries, wherein I should employ the same to wholly form the walls, partitions, and floors.

In another application for patent filed of even date herewith, I have set forth modes of using glass as an earth-covering—as for pavements, cellar-bottoms, &c. Combining with the glass foundations or walls herein described the earth-floor referred to in said application, complete means are provided whereby the interior of buildings may be wholly cut off from all miasmatic and other destructive or harmful influences emanating from the soil.

In many large cities there are extensive tracts of "made ground" derived from filling bogs and wet places. Such tracts are often so favorably situated as to be of great value, but are, in fact, otherwise, because of the dampness communicated through the foundation-walls to the interior of buildings erected thereon, which dampness operates to render them unhealthy and uncomfortable, and to injure such objects and utensils as are liable to rust and mold. The employment of glass, if only as a substructure for such buildings and as a floor for the cellar, will wholly obviate this difficulty. The injurious and destructive effects of earth-moisture are not, however, peculiar to such special localities, but are present, to a greater degree than is commonly supposed, everywhere. In rarely-favored situations dampness and mold ultimately make themselves felt, and in the case of a class of articles requiring to be long or carefully preserved—as papers, paintings, books and similar treasures—they represent the very "tooth of Time." It is believed that glass may, with great economic and sanitary advantage, be employed in every variety of public and private buildings, on account of its non-absorbent and non-transmissive properties with reference to moisture.

I have found that glass composed of coarse materials may be manufactured into blocks suitable for foundation-walls at a cost that will render this substance readily available for the purpose. I also believe that blocks of glass of suitable grade to enter into or wholly form the superstructure of buildings may be economically employed, in view of its many advantages, above in part pointed out.

The drawing shows in perspective a large block, A, of glass adapted for building purposes in place of stone or bricks. R R are recesses in the hidden faces of the block, intended to lessen the quantity of material required in a block of given dimensions. Said recesses will depend, as to their relative size, upon the situation in the structure to be occupied by the block. In blocks resting on the ground said recesses may be absent, or may extend only part way through the block.

G G are grooves or depressions in the horizontal faces of the block, intended to receive the cement with which the blocks are laid up in the wall, to more effectually prevent lateral movement of one upon another, to which they would possibly be liable if otherwise smooth on their proximate faces. To make the blocks rough on said faces would be the equivalent of said grooves, as would also forming the blocks with projections to enter grooves of adjacent blocks.

The essential features of my invention being the use of glass as a material forming the body of the structure or substructure of a building, I do not restrict myself to any particular size, form, or mode of making the blocks. The material, being adapted to be molded into any desired shape, may be used for all parts of building-walls. It may also be made either opaque, transparent, or simply translucent, and it may also be given any desired color.

While it is not intended to wholly dispense with the ordinary form of glass windows in buildings of glass, it will in many cases, as in factories, be of obvious advantage to have the walls themselves translucent. The effect of such provision will be the diffusion of a uniform light throughout the interior, by which far more space will be available for use than if windows alone be relied upon for light. By the use of selected colors, moreover, specially-desired qualities in the light may also be obtained, with reference either to a particular work to be done, as in factories, or to a particular sanitary or æsthetic effect sought, as in hospitals and dwellings.

In the use of glass for building-walls lath and plaster may be wholly dispensed with, and the interior surface of the walls may be given any required color, while preserving its translucency, if desired, by means of certain pigments mixed with the substance of the blocks; or, if preferred, paint or other finish may be interiorly applied to the wall-surface.

While a glass house would, in the nature of the case, be substantially fire-proof, in some situations it might be necessary, at the expense of translucency, to protect the building against injury from fire in the immediate vicinity. In such case an outer wall or veneer of brick or marble may be combined with the glass to afford the required protection; or substances may be employed in the glass that will render the same refractory to heat.

I am, of course, well aware that glass plates supported by iron and other frame-work have been used to cover a principal part of the area of building-walls; but such plates are simply enlarged windows, and have practically nothing to do with the strength of the structure. My invention differs from such use of glass in that the blocks in said invention constitute the walls themselves, taking the place of the frame-work, and not simply or necessarily at all the place of the windows.

I am also aware that glass has been employed as an outer facing for buildings, in connection with ordinary building materials, such as brick and stone; and, still further, that hollow columns and inner and outer facings of glass have been used in connection with a filling of cement. These applications of glass do not fall within or answer the purposes of my invention, since the brick, stone, cement, &c., serve to transmit moisture, and, moreover, since these substances constitute, practically, the body of the structure. In such use of glass with other materials, also, the special effects of translucency, transparency, and special coloring of the material which I have pointed out are prevented.

Having thus described my invention, I claim—

1. As a new article of manufacture, a building-block made of glass, of any suitable or desirable form, and of such dimensions as will form the entire wall or thickness of the wall of a building when placed therein in the ordinary manner, substantially as described, and for the purposes set forth.

2. A building the walls of which are constructed of blocks of glass molded in suitable form for the purpose, so constructed and applied in the wall, as described, as to intercept or prevent the upward passage of moisture from the earth in such wall.

3. In a building-wall, one or more courses of glass blocks occupying the entire thickness of the wall, so as to intercept or prevent the upward passage of moisture from the earth in such wall.

4. A building-wall constructed from blocks of glass molded in suitable form for the purpose, and so applied as to permit the passage of white or colored light through the same to the interior of the structure, as well as to form a strengthening and supporting part of the edifice, substantially as described.

In testimony that I claim the foregoing as my invention I affix my signature in presence of two witnesses.

C. W. McLEAN.

Witnesses:
M. E. DAYTON,
JESSE COX, Jr.